United States Patent Office 3,183,192
Patented May 11, 1965

3,183,192
CHLOROFLUOROALKANE COMPOSITIONS
Albert W. Bauer, Wilmington, Del., assignor to E. I. du Pont de Nemours and Company, Wilmington, Del., a corporation of Delaware
No Drawing. Filed Oct. 30, 1961, Ser. No. 148,724
7 Claims. (Cl. 252—188.3)

This invention relates to chlorofluoroalkane compositions and particularly to certain chlorofluoroalkanes containing minor proportions of compounds which inhibit reaction of the chlorofluoroalkanes with primary and secondary polyols.

Although it has been known for several years that perfluorinated olefins are sensitive to attack by oxygen, saturated fluorine-containing perhalogenated hydrocarbons are considered to be stable under ordinary conditions and, indeed, oxidation and hydrolysis, which cause the decomposition of other halogenated hydrocarbons, have no effect on the fluorine-containing compounds. Recently, it was reported that certain fluorine-containing perhaloalkanes, including trichlorofluoromethane, react fairly rapidly with alkanols in the presence of silver ions to give hydrogen halide, an aldehyde or ketone (depending on whether a primary or secondary alcohol is involved) and a reduced halogenated organic compound wherein one chlorine or bromine has been replaced by hydrogen [Heberling, Jr., et al., J.A.C.S., 78, 5433 (1956)]. The silver ion naturally reacts with the hydrogen halide to precipitate silver halide. Silver ion was shown to catalyze the reaction but not to be a necessary reactant, albeit the reaction is very much slower without silver ion. The reaction was not reported for trichlorofluoromethane in the absence of silver ions. The reaction that occurs between trichlorofluoromethane and ethyl alcohol is as follows:

$CCl_3F + CH_3CH_2OH \rightarrow CHCl_2F + CH_3CHO + HCl$

This reaction does not appear to occur with more highly fluorinated chlorofluoromethanes such as dichlorodifluoromethane. The reaction was shown to occur only in the presence of primary and secondary alcohols, tertiary alcohols being unreactive, and to be briefly inhibited by hydroquinone. In the pure state, trichlorofluoromethane is quite stable.

L. J. Long, in his copending application Serial No. 28,223, filed May 11, 1960, now U.S. Patent 3,090,818, has disclosed that certain olefinic compounds are effective to inhibit the reaction of chlorofluoroalkanes with primary and secondary alkanols. Such inhibiting action is specific to the particular olefinic compounds and to the primary and secondary alkanols, closely related olefinic compounds being ineffective for such purpose.

Chlorofluoroalkanes are also used extensively as blowing agents in combination with polyols which are reacted with polyfunctional isocyanates to form polyurethane foams. The chlorofluoroalkanes of the class of trichlorofluormethane (CFCl$_3$), trichlorotrifluoroethanes (C$_2$F$_3$Cl$_3$), and tetrachlorodifluoroethanes (C$_2$F$_2$Cl$_4$) appear to react with the primary and secondary polyols in a manner similar to their reaction with primary and secondary alkanols, i.e., to form hydrogen chloride, an aldehyde or a ketone, and a reduced haloalkane, i.e., CHFCl$_2$, C$_2$HF$_3$Cl$_2$, and C$_2$F$_2$HCl$_3$, respectively, the mechanism of the reaction being similar to that with the monohydric alcohols. The products, formed by the reaction of these chlorofluoroalkanes with such polyols, adversely affect the properties of the polyurethane foams which are prepared from them as well as interfering with the foam producing reaction. Thus, it is desirable to inhibit the reaction between chlorofluoroalkanes and the primary and secondary polyols. However, it has been found that the reaction between the chlorofluoroalkanes and the polyols does not respond to olefinic inhibitors identically with that between the chlorofluoroalkanes and the alkanols of Long, only some of the olefinic compounds disclosed by Long (above referred to) being effective to inhibit the reaction of the chlorofluoroalkanes with the primary and secondary polyols, some of the olefinic compounds of Long being not effective with the polyols, and many olefinic compounds which are ineffective with the alkanols of Long being very effective to inhibit the reaction of the chlorofluoroalkanes and the primary and secondary polyols.

It is an object of this invention to provide means to inhibit the reaction between primary and secondary polyols and trichlorofluoromethane, trichlorotrifluoroethanes and tetrachlorodifluoroethanes. A particular object is to provide inhibitors for such purposes which are non-acidic, relatively non-toxic, relatively inexpensive, and which are effective in small concentrations and for reasonably long periods of time. Other objects are to provide new compositions of matter and to advance the art. Still other objects will appear hereinafter.

The above and other objects may be accomplished in accordance with this invention which comprises inhibiting the reaction of at least one chlorofluoroalkane of the group consisting of trichlorofluoromethane, trichlorotrifluoroethanes, and tetrachlorodifluoroethanes with one or more polyols of the group consisting of primary and secondary polyols which are useful for preparing polyurethane foams by reaction with polyfunctional isocyanates by means of from about 0.05% to about 5% by weight based on the chlorofluoroalkane of at least one olefinic compound of the group consisting of allo ocimene, butadiene, isoprene, vinyl chloride, vinylidene chloride, styrene, α-methyl styrene, acrylonitrile, α-pinene, β-pinene, terpinolene, α-terpinene, β-terpinene, d-limonene, 1-alkene of 4 to 18 carbon atoms, lower alkyl acrylates and lower alkyl methacrylates; the combination of the chlorofluoroalkanes, the primary and secondary polyols and the olefinic compounds being new compositions of matter. Also, the mixture of one or more of the chlorofluoroalkanes with at least one olefinic compound of the group consisting of allo ocimene, vinylidene chloride, styrene, acrylonitrile, α-methyl styrene, α-pinene, β-pinene, terpinolene, α-terpinene, β-terpinene, d-limonene, 1-alkenes of 5 to 18 carbon atoms, lower alkyl acrylates, and alkyl methacrylates in which the alkyl groups contain 2 to 4 carbon atoms, are new compositions of matter.

It has been found that, if the aforesaid olefinic compounds are present when the aforesaid chlorofluoroalkanes are brought into contact with primary and secondary polyols, the reaction normally occurring between the chlorofluoroalkane and the polyol is effectively inhibited under ordinary storage conditions. Said olefinic compounds are non-acidic, generally are substantially non-toxic, low in cost and are highly effective in small concentrations. They do not have objectionable color and are not corrosive to metals and do not attack most materials with which the compositions of this invention will ordinarily be brought into contact. The mechanism by which these compounds inhibit the reaction between the chlorofluoroalkanes and the polyols is not known with certainty and could not be predicted.

It should be understood however, that most uses, which require bringing the aforesaid chlorofluoroalkanes in contact with primary and secondary polyols, do not require that the mixture be stored for long periods of time before use. For example, in the preparation of polyurethane foams which is a major use for such mixtures, the mixture of chlorofluoroalkane, polyol and olefinic compound can be prepared immediately before use or at most a few hours or days before use. Thus, the inhibitors of this invention need not be effective for long periods of time although these inhibitors are effective for quite extended periods.

The inhibiting effect appears to be specific to the aforesaid olefinic compounds. Closely related olefinic compounds, such as 2-butene and 2-pentene, vinyl acetate, N-vinyl pyrrolidone, methyl vinyl ketone, glycidal methacrylate and acetylenic compounds, are ineffective or substantially so for the purposes of this invention; whereby the effectiveness of the compounds of this invention is surprising. Also, hydroquinone and like phenolic compounds, free radical inhibitors, and, in general, compounds known to be useful for inhibiting the decomposition of chlorinated hydrocarbons, are not useful for the purposes of this invention because of little or no effectiveness to inhibit the reaction, cost, objectionable odor or color, toxicity, acidity, reactivity toward isocyanates and like defects.

The primary and secondary polyols, with which this invention is concerned, are those which are useful for preparing polyurethane foams by reaction with polyfunctional isocyanates in the presence of chlorofluoroalkane blowing agents by any of the methods known to the art, including mixtures of any two or more of such polyols. Such polyols are the normally liquid polyols, i.e., are liquid at normal room temperature and pressure, which contain a plurality of aliphatic hydroxyl groups at least two of which are attached to primary or secondary aliphatic carbon atoms and which are capable of dissolving at least 3% by weight of the chlorofluoroalkane blowing agents of this invention to provide solutions having a viscosity of less than 30,000 centistokes at room temperature.

The primary and secondary polyols of the aforesaid characteristics are selected from the aminic (amine based) primary and secondary polyols and the polymeric primary and secondary polyols which contain at least 4 carbon atoms per hydroxyl group and at least 5 linkages selected from ether, carboxy ester, and carbamate linkages which may be the same or different. The aminic primary and secondary polyols are the condensation products of aliphatic polyamines, usually di- or triamines, with alkylene oxides, particularly ethylene and propylene oxides, wherein all of the amine hydrogens are substituted by hydroxyalkyl groups. Some examples are N,N,N',N'-tetrakis(2-hydroxypropyl)-ethylenediamine, N,N,N'-tris(2-hydroxypropyl)-N'-(2-hydroxyethyl)-ethylenediamine and N,N,N',N'',N''-pentakis(2-hydroxypropyl)diethylene-triamine. Such aminic polyols are described in U.S. Patents 2,697,118, 2,878,144, 2,878,273, and others.

The polymeric primary and secondary polyols are represented by long chain esters formed from castor oil, and the polyalkylene glycols such as polyethylene glycol, polypropylene glycol, poly(ethylene-propylene) glycol and polytetramethylene glycol. Others include polyesters such as those prepared by reacting an aliphatic dicarboxylic acid with a glycol in such proportions that both ends of the polymer are terminated by aliphatic hydroxyl groups, e.g., the reaction product of adipic acid or the like with ethylene glycol or the like, or the reaction products of lactones containing 6 to 8 ring carbons with polyfunctional alcohols, or the reaction products of lactones, polyfunctional alcohols and vicinal epoxides, the polyfunctional alcohols usually being aminic alcohols. Still others include polyhydroxyether derivatives of polyhydroxy aliphatic compounds such as the reaction products of sugar alcohols, glycerine, trimethylolpropane, and the like with alkylene oxides, e.g., the reaction product of sorbitol with 10 moles of propylene oxide. The use of these types of polyols and others is described in the following representative U.S. patents: 2,941,967, 2,948,691, 2,949,431, 2,950,262, 2,955,091, 2,956,031, 2,961,418, 2,962,524, 2,970,118, 2,986,576, 2,990,379, 2,927,905, 2,932,621, 2,939,851, and 2,937,152. Still other examples are the isocyanate condensation products with alkylene glycols or polyalkylene ether glycols terminated at each end by an aliphatic hydroxyl group, e.g., compounds of the structure

where $m$ is an integer of at least 2, R is a polyalkylene ether group derived from a polyglycol such as

$H[OCH_2CH(CH_3)]_nOH$ or $H(OCH_2CH_2CH_2CH_2)_nOH$ in which $n$ is an integer of at least 2 and may be as high as 15–20, and R' is a divalent aromatic group such as tolylene, diphenylene or the divalent diphenyl ether group. A typical example is

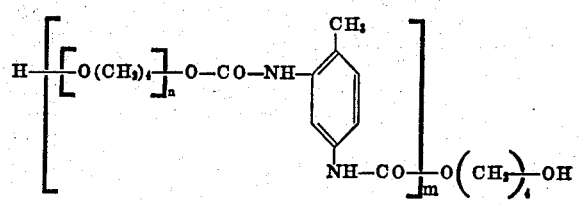

The chlorofluoroalkanes to be used or treated in accord with this invention are trichlorofluoromethane, 1,1,2-trichloro-1,2,2-trifluoroethane, 1,1,1-trichloro-2,2,2,-trifluoroethane, tetrachloro-1,2-difluoroethane, tetrachloro-2-2-difluoroethane, and mixtures of any two or more thereof. The invention is most preferably applied to trichlorofluoromethane.

The olefinic compounds which are effective for the purpose of this invention are allo ocimene, butadiene, isoprene, vinyl chloride, vinylidene chloride, styrene, α-methyl styrene, acrylonitrile, α-pinene, β-pinene, terpinolene, α-terpinene, β-terpinene, d-limonene, 1-alkenes of 4 to 18 carbon atoms which may be in a straight or branched chain such as 1-butene, 1-pentene, 1-hexane, 1-octene, 1-hexadecene, isobutylene, 2-methyl-1-butene, diisobutylene; lower alkyl acrylates, and lower alkyl methacrylates. In the acrylates and the methacrylates, "lower alkyl" will be understood to mean straight or branched chain alkyl radicals of 1 to 4 carbon atoms such as methyl, ethyl, propyl, isopropyl, butyl and isobutyl. Diisobutylene ordinarily is a mixture of compounds having the formula $CH_2=C(CH_3)—CH_2C(CH_3)$, i.e., the 1-alkene structure, and $(CH_3)_2—C=CH—C(CH_3)_3$;

β-Pinene has the structure

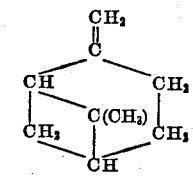

d-Limonene has the structure

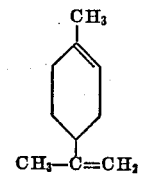

Alpha-terpinene has the structure

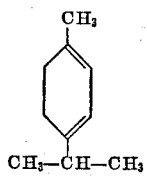

Beta-terpinene has the structure

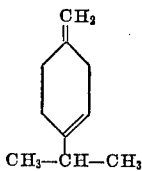

and allo-ocimene has the structure $$CH_3CH=C(CH_3)-CH=CH-CH=C(CH_3)_2$$

Mixtures of any two or more of such olefinic compounds may be used, such as "Terpene-B" which is a mixture of terpene hydrocarbons comprising approximately equivalent amounts of d-limonene, terpinenes and terpinolene. Allo-ocimene, "Terpene-B," diisobutylene and isobutylene are preferred.

The olefinic inhibitor compound will be employed in a proportion of from about 0.05% to about 5% by weight based on the chlorofluoroalkane. Materially smaller proportions are less effective and for shorter periods of time. Larger proportions of the inhibitors may be employed but are unnecessary for most purposes and tend to be uneconomical.

The olefinic compounds of this invention are soluble in both the chlorofluoroalkanes and the polyols. Also, the chlorofluoroalkanes and the polyols are soluble in each other. The inhibitor can be added to the chlorofluoroalkane, or to the primary or secondary polyol, or to compositions containing either or both the chlorofluoroalkane and the polyol. The primary or secondary polyol may be mixed with a solvent. It is preferred to add the inhibitor to the chlorofluoroalkane or to the primary or secondary polyol prior to mixing the chlorofluoroalkane with the polyol, so that it will be present when the chlorofluoroalkane comes into contact with or is admixed with a primary or secondary polyol or with compositions containing such polyols.

In order to more clearly illustrate this invention and the advantageous results to be obtained thereby, examples are given hereinafter in Tables I through VI. Unless otherwise specified, all aging tests in Tables I, II, III, IV, V and VI were carried out in mixtures of 70% by weight of the polyol and 30% by weight of the chlorofluoroalkane. All samples were aged in tin-plated steel containers closed with blank tin-plated steel caps.

The concentration of acid in the aged mixtures (mole acid/mole $CFCl_3$) was determined by titration with standardized alcoholic potassium hydroxide using alphanaphthol-benzein indicator.

Samples of the aged mixtures were checked for color change visually. All initial samples were white or light yellow. Some samples were also tested for free halide ion with silver nitrate solution. A definite precipitate was called positive; a milky color was called "trace."

The "pH" was determined by use of a Beckman pH meter using the calomel and glass electrodes. The "pH" values determined should only be compared among themselves. The values are not directly correlatable with hydrogen ion concentration because the readings are taken in non-aqueous solution. Corrosion of the cans was evaluated as follows: no visual change—no corrosion; discoloration or very slight etching—slight corrosion; visual, mild attack on metal, no salt deposits—moderate corrosion; heavy attack on metal accompanied, usually, by salt formation, bulging and/or perforation of the can—severe corrosion. A prospective inhibitor was considered satisfactory if the color change was not severe, if insufficient corrosion took place to weaken a metallic container, and if insufficient hydrogen ion was formed to cause the mixture to be sufficiently acidic to affect adversely any products prepared therefrom.

The results obtained are shown in the following Tables I to VI which show the effect of storage of mixtures of inhibitor, chlorofluoroalkane and "polyol A" which is the condensation product of one mole of sorbitol with 10 moles of propylene oxide, aminic polyols, and mixtures of the two types. The structure of the sorbitol derivative is not certain since it is not known whether all of the propylene oxide condenses on one or several hydroxyl groups of the sorbitol. It is certain that the product contains a plurality of primary and secondary hydroxyl groups as well as ether linkages. Similar results are observed when polypropylene glycol is used in place of the sorbitol derivative.

The tests in Tables I and II were run at 194° F. for 1 to 2 days. Experience has shown that 48 hours at 194° F. is approximately equivalent to 6 months at 100° F. so far as reaction between polyol and chlorofluoroalkane, can corrosion and acid production are concerned. The tests in Tables III to VI were run at 130° F. for 4 to 77 days, and also show the amounts of reduced chlorofluoroalkane produced by reaction with the polyols.

It is understood that, while the tests given in Tables I to VI are for certain specific polyols, reaction occurs between the chlorofluoroalkanes noted and any polyol containing two primary and/or secondary hydroxyl groups and that the inhibitors noted are effective with all such types of polyols.

TABLE I

[70% "polyol A"-30% $CFCl_3$, 194° F.]

| No. | Aging period | Inhibitor (0.15% in $CFCl_3$) | Mole acid/ mole $CFCl_3$ | pH Initial | pH Final | Can corrosion | Color | Silver nitrate test |
|---|---|---|---|---|---|---|---|---|
| 1 | 1 day | None | 0.099 | 7.7 | 2.2 | Moderate | Dk. brown | Positive. |
| 2 | do | Methyl methacrylate | 0.004 | 7.6 | 8.1 | Slight | Yellow | Trace. |
| 3 | do | Isobutylene | 0.002 | 7.7 | 2.8 | do | do | Do. |
| 4 | 2 days | None | 0.190 | 7.7 | 0.2 | Moderate | Black | Positive. |
| 5 | do | Methyl methacrylate | 0.007 | 7.6 | 1.6 | Slight | Yellow | Do. |
| 6 | do | Isobutylene | 0.004 | 7.7 | 1.6 | do | Lt. yellow | Trace. |
| 7 | 1 day | Vinyl chloride | 0.008 | | | V. slight | Brown | Negative. |
| 8 | do | Butadiene | 0.001 | | | do | Yellow | Do. |
| 9 | 2 days | do | 0.001 | | | do | do | Do. |

TABLE II

[70% "polyol A"–30% $CF_2ClCFCl_2$, 194° F.]

| No. | Aging period | Inhibitor (0.15% in $CF_2ClCFCl_2$) | Mole acid/mole $CF_2ClCFCl_2$ | pH Initial | pH Final | Can corrosion | Color | Silver Nitrate test |
|---|---|---|---|---|---|---|---|---|
| 1 | 1 day | None | 0.023 | 8.9 | 6.0 | Moderate | Yellow | Positive. |
| 2 | do | Vinyl chloride | 0.002 | 8.8 | 8.2 | do | do | Negative. |
| 3 | do | Butadiene | 0.001 | 8.8 | 8.5 | Slight | Lt. yellow | Do. |
| 4 | do | Isobutylene | 0.007 | 8.3 | 6.8 | Moderate | Yellow | Do. |
| 5 | 2 days | None | 0.092 | 8.9 | 7.8 | do | Lt. brown | Positive. |
| 6 | do | Vinyl chloride | 0.012 | 8.8 | 7.7 | do | Yellow | Do. |
| 7 | do | Butadiene | 0.008 | 8.8 | 7.7 | do | do | Do. |
| 8 | do | Isobutylene | 0.017 | 8.3 | 7.8 | do | do | Do. |

Table III

[Ageing of 70% "polyol A"—30% $CFCl_3$ at 130° F.]

| Inhibitor | Conc. percent in $CFCl_3$ | Days | Acid, meq./100 g. | Color | Odor | Can corrosion | $CHFCl_2$* |
|---|---|---|---|---|---|---|---|
| None | | 0 | 0 | Lt. yellow | Satisfactory | | nt. |
| | | 8 | 0.11 | do | do | None | +. |
| | | 77 | 414 | Dark brown | Stench | Moderate | +. |
| Diisobutylene | 0.5 | 0 | 0 | Lt. yellow | Satisfactory | | nt. |
| | 0.5 | 8 | 0.09 | do | do | None | +. |
| | 0.5 | 77 | 114 | Dark brown | Strong | Slight | +. |
| Methyl methacrylate | 0.5 | 0 | 0 | Lt. yellow | Satisfactory | | nt. |
| | 0.5 | 8 | 0.09 | do | do | None | +. |
| | 0.5 | 77 | 214 | Dark brown | Strong | Moderate | +. |
| Acrylonitrile | 0.5 | 0 | 0 | Lt. yellow | Satisfactory | | nt. |
| | 0.5 | 8 | 0.07 | do | do | None | +. |
| | 0.5 | 77 | 27 | Brown | do | do | +. |
| Vinylidene chloride | 0.5 | 0 | 0 | Lt. yellow | Satisfactory | | nt. |
| | 0.5 | 8 | 0.09 | do | do | None | +. |
| | 0.5 | 77 | 391 | Dark brown | Strong | Moderate | +. |
| Vinyl acetate | 0.5 | 0 | | Lt. yellow | Satisfactory | | nt. |
| | 0.5 | 8 | 0.14 | do | do | None | +. |
| | 0.5 | 77 | 434 | Dark brown | Stench | Moderate | +. |
| Allo ocimene | 0.5 | 7 | 0.3 | Lt. yellow | Satisfactory | None | nt. |
| | 0.5 | 21 | 0.3 | Yellow | do | do | nt. |

*+, present; −, absent; nt., not tested.

Table IV

[Ageing of 30/70: $CFCl_3$/N, N, N′,N′-tetrakis (2-hydroxypropyl) ethylenediamine at 130° F.]

| Inhibitor | Conc. in $CFCl_3$, percent | Days | Acid, meq./100 g. | $CHFCl_2$* | Color | Odor |
|---|---|---|---|---|---|---|
| None | | 0 | 0 | nt | Colorless | Satisfactory. |
| | | 4 | 44 | + | Dark brown | |
| | | 7 | 56 | + | do | Do. |
| | | 12 | 65 | nt | do | |
| | | 18 | 76 | + | do | Do. |
| | | 34 | 94 | + | do | |
| Isobutylene | 1 | 0 | | nt | Lt. yellow | Satisfactory. |
| | 1 | 4 | 8 | + | Yellow | |
| | 1 | 7 | 11 | + | Brown | |
| | 1.17 | 12 | 9.7 | nt | Lt. brown | Do. |
| | 1.00 | 18 | 18 | + | Brown | |
| | 1.17 | 34 | 20 | + | Dark brown | Do. |
| Diisobutylene | 1.0 | 0 | 0 | nt | Colorless | Satisfactory. |
| | 1.0 | 4 | 5 | + | Lt. brown | |
| | 0.5 | 7 | 3 | nt | Dark yellow | Do. |
| | 1.0 | 7 | 4 | + | Lt. brown | |
| | 1.17 | 12 | 3.1 | nt | Yellow | Mod. pungent. |
| | 1.0 | 18 | 8 | + | Brown | |
| | 1.17 | 34 | 73 | + | do | Strong. |
| 2-methyl-1-butene | 1.17 | 0 | 0 | nt | Colorless | Satisfactory. |
| | 1.17 | 12 | 15.3 | nt | Brown | Do. |
| | 1.17 | 34 | 45 | + | Dark brown | Do. |
| d-Limonene | 0.5 | 7 | 16 | nt | Brown | Satisfactory. |
| Terpene-B | 0.5 | 7 | 2 | nt | Yellow | Do. |
| Acrylonitrile | 0.5 | 7 | 41 | nt | Dark brown | Do. |
| Methyl methacrylate | 0.5 | 7 | 19 | nt | Brown | Do. |
| Isoprene | 0.5 | 7 | 0.4 | nt | Yellow | Do. |
| 1-pentene | 0.5 | 7 | 21 | nt | Brown | Do. |
| Styrene | 0.5 | 7 | 2 | nt | Yellow | Do. |
| Hexadecene-1 | 0.5 | 7 | 40 | nt | Dark brown | Do. |
| α-Methyl styrene | 0.5 | 7 | 0.8 | nt | Yellow | Do. |
| Vinylidene chloride | 0.5 | 7 | 36 | nt | Dark brown | Do. |
| 1,3-butadiene | 0.5 | 7 | 1 | nt | Yellow | Do. |
| α-Pinene | 0.5 | 7 | 20 | nt | Brown | Do. |
| Allo ocimene | 0.5 | 7 | 3 | nt | Lt. yellow | Do. |

*+, present; −, absent; nt, not tested.

Table V

[Ageing of 30/70: CFCl₃/N,N,N'N'',N''-pentakis(2-hydroxypropyl) diethylene triamine at 130° F.]

| Inhibitor, 1% in CFCl₃ | Days | Acid, meg./100 g. | CHCl₂F* | Color |
|---|---|---|---|---|
| None | 0 | 0 | − | Colorless. |
|  | 4 | 41 | + | Yellow. |
|  | 7 | 56 | + | Dark brown. |
|  | 18 | 81 | + | Do. |
| Isobutylene | 0 | 0 | − | Colorless. |
|  | 4 | 10 | + | Yellow. |
|  | 7 | 17 | + | Dark brown. |
|  | 18 | 53 | + | Do. |
| Diisobutylene | 0 | 0 | − | Colorless. |
|  | 4 | 3 | + | Dark yellow. |
|  | 7 | 5 | + | Brown. |
|  | 18 | 31 | + | Dark brown. |

*+, present; −, absent; nt, not tested.

Table VI

[Ageing of 30/70: CFCl₃/20% N,N,N',N'-tetrakis(2-hydroxypropyl)ethylene diamine–80% "polyol A" at 130° F.]

| Inhibitor (1% conc.) | Days | Acidity (meg./100g.) | Color | Odor | Can corrosion |
|---|---|---|---|---|---|
| None | 0 | 0 | None | Satisfactory | None. |
|  | 7 | 13 | Brown | do | Do. |
|  | 21 | 14 | Dark brown | do | Slight. |
|  | 42 | 17 | do | do | Do. |
| Diisobutylene | 0 | 0 | None | do | None. |
|  | 7 | 2 | Yellow | do | Do. |
|  | 21 | 2 | do | do | Do. |
|  | 42 | 3 | do | do | Slight. |
| Terpene-B | 0 | 0 | None | do | None. |
|  | 7 | <1 | Yellow | do | Do. |
|  | 21 | 2 | do | do | Slight. |
|  | 42 | 2 | do | do | Do. |
| d-Limonene | 0 | 0 | None | do | None. |
|  | 10 | 2 | Yellow | do | Do. |
|  | 45 | 6 | Dark yellow | do | Slight. |
| Acrylonitrile | 0 | 0 | None | do | None. |
|  | 10 | 4 | Yellow | do | Do. |
|  | 45 | 8 | Brown | do | Do. |

These examples demonstrate that the olefins shown inhibit the reaction between the subject chlorofluoroalkanes and primary and secondary polyols.

It will be understood that the preceding examples have been given for illustrative purposes solely and that this invention is not limited to the specific embodiments described therein. On the other hand, it will be apparent to those skilled in the art that, subject to the limitations set forth in the general description, the materials and proportions may be considerably varied without departing from the spirit or scope of this invention.

From the preceding description, it will be apparent that this invention provides novel compositions of certain chlorofluoroalkanes and certain olefinic compounds which are resistant to the reaction which normally occurs between said chlorofluoroalkanes and primary and secondary polyols. Therefore, there is provided a means whereby said chlorofluoralkanes can be employed in conjunction with primary and secondary polyols and maintained in contact or admixture therewith for long periods of time without the aforesaid undesirable reactions taking place. Accordingly, it will be apparent that this invention constitutes a valuable advance in and contribution to the art.

The invention is hereby claimed as follows:

1. A composition, resistant to reaction with primary and secondary polyols, which consists essentially of at least one chlorofluoroalkane of the group consisting of trichlorofluoromethane, trichlorotrifluoroethanes and tetrachlorodifluoroethanes and from about 0.05% to about 5% by weight based on the chlorofluoroalkane of allo ocimene.

2. A composition which consists essentially of at least one normally liquid polyol which contains a plurality of aliphatic hydroxyl groups at least two of which are attached to carbon atoms of the group consisting of primary and secondary aliphatic carbon atoms and which polyol is useful for preparing polyurethane foams by reaction with polyfunctional isocyanates in the presence of a chlorofluoroalkane blowing agent and is capable of dissolving at least 3% by weight of the chlorofluoroalkane blowing agent, having dissolved therein an effective amount for blowing of at least one chlorofluoroalkane blowing agent of the group consisting of trichlorofluoromethane, trichlorotrifluoroethanes and tetrachlorodifluoroethanes, which chlorofluoroalkane contains from about 0.05% to about 5% by weight based on the chlorofluoroalkane of at least one olefinic compound of the group consisting of allo ocimene, butadiene, isoprene, vinyl chloride, vinylidene chloride, styrene, α-methyl styrene, acrylonitrile, α-pinene, β-pinene, terpinolene, α-terpinene, β-terpinene, d-limonene, 1-alkenes of 4 to 18 carbon atoms, alkyl acrylates in which the alkyl groups contain 1 to 4 carbon atoms, and alkyl methacrylates in which the alkyl groups contain 1 to 4 carbon atoms.

3. A composition which consists essentially of at least one normally liquid polyol which contains a plurality of aliphatic hydroxyl groups at least two of which are attached to carbon atoms of the group consisting of primary and secondary aliphatic carbon atoms and which polyol is useful for preparing polyurethane foams by reaction with polyfunctional isocyanates in the presence of a chlorofluoroalkane blowing agent and is capable of dissolving at least 3% by weight of the chlorofluoroalkane blowing agent, having dissolved therein an effective amount for blowing of at least one chlorofluoroalkane blowing agent of the group consisting of trichlorofluoromethane, trichlorotrifluoroethanes and tetrachlorodifluoroethanes, which chlorofluoroalkane contains from about 0.05% to about 5% by weight based on the chlorofluoroalkane of at least one 1-alkene of 4 to 18 carbon atoms.

4. A composition which consists essentially of at least one normally liquid polyol which contains a plurality of aliphatic hydroxyl groups at least two of which are attached to carbon atoms of the group consisting of primary and secondary aliphatic carbon atoms and which polyol is useful for preparing polyurethane foams by reaction with polyfunctional isocyanates in the presence of a chlorofluoroalkane blowing agent and is capable of dissolving at least 3% by weight of the chlorofluoroalkane blowing agent, having dissolved therein an effective amount for blowing of at least one chlorofluoroalkane blowing agent of the group consisting of trichlorofluoromethane, trichlorotrifluoroethanes and tetrachlorodifluoroethanes, which chlorofluoroethane contains from about 0.05% to about 5% by weight based on the chlorofluoroalkane of isobutylene.

5. A composition which consists essentially of at least one normally liquid polyol which contains a plurality of aliphatic hydroxyl groups at least two of which are attached to carbon atoms of the group consisting of primary and secondary aliphatic carbon atoms and which polyol is useful for preparing polyurethane foams by reaction with polyfunctional isocyanates in the presence of a chlorofluoroalkane blowing agent and is capable of dissolving at least 3% by weight of the chlorofluoroalkane blowing agent, having dissolved therein an effective amount for blowing of at least one chlorofluoroalkane blowing agent of the group consisting of trichlorofluoromethane, trichlorotrifluoroethanes and tetrachlorodifluoroethanes, which chlorofluoroalkane contains from about 0.05 % to about 5% by weight based on the chlorofluoroalkane of diisobutylene.

6. A composition which consists essentially of at least one normally liquid polyol which contains a plurality of aliphatic hydroxyl groups at least two of which are attached to carbon atoms of the group consisting of primary and secondary aliphatic carbon atoms and which polyol is useful for preparing polyurethane foams by reaction with polyfunctional isocyanates in the presence of a chlorofluoroalkane blowing agent and is capable of dissolving at least 3% by weight of the chlorofluoroalkane blowing agent, having dissolved therein an effective amount for blowing of at least one chlorofluoroalkane blowing agent of the group consisting of trichlorofluoromethane, trichlorotrifluoroethanes and tetrachlorodifluoroethanes, which chlorofluoroalkane contains from about 0.05% to about 5% by weight based on the chlorofluoroalkane of a mixture of terpene hydrocarbons comprising approximately equivalent amounts of d-limonene, terpinenes and terpinolene.

7. A composition which consists essentially of at least one normally liquid polyol which contains a plurality of aliphatic hydroxyl groups at least two of which are attached to carbon atoms of the group consisting of primary and secondary aliphatic carbon atoms and which polyol is useful for preparing polyurethane foams by reaction with polyfunctional isocyanates in the presence of a chlorofluoroalkane blowing agent and is capable of dissolving at least 3% by weight of the chlorofluoroalkane blowing agent, having dissolved therein an effective amount for blowing of at least one chlorofluoroalkane blowing agent of the group consisting of trichlorofluoromethane, trichlorotrifluoroethanes and tetrachlorodifluoroethanes, which chlorofluoroalkane contains from about 0.05% to about 5% by weight based on the chlorofluoroalkane of allo ocimene.

References Cited by the Examiner
UNITED STATES PATENTS

| | | | |
|---|---|---|---|
| 2,551,639 | 5/51 | Feasley et al. | 252—78 XR |
| 2,603,663 | 7/52 | Feasley et al. | 260—653 XR |
| 2,636,074 | 4/53 | Ross | 252—66 XR |
| 3,085,116 | 4/63 | Kvalnes | 260—632.5 XR |
| 3,090,818 | 5/63 | Long | 252—171 XR |

JULIUS GREENWALD, *Primary Examiner.*

Disclaimer 3,183,192.—*Albert W. Bauer*, Wilmington, Del. CHLOROFLUORO-ALKANE COMPOSITIONS. Patent dated May 11, 1965. Disclaimer filed June 22, 1966, by the assignee, *E. I. du Pont de Nemours & Company*.

Hereby enters this disclaimer to claims 2 through 7, inclusive, of said patent.

[*Official Gazette October 11, 1966.*]